(12) United States Patent
Fukushima et al.

(10) Patent No.: US 10,978,103 B2
(45) Date of Patent: *Apr. 13, 2021

(54) MAGNETIC RECORDING MEDIUM AND MAGNETIC STORAGE APPARATUS

(71) Applicant: SHOWA DENKO K.K., Tokyo (JP)

(72) Inventors: Takayuki Fukushima, Chiba (JP); Kazuya Niwa, Chiba (JP); Lei Zhang, Chiba (JP); Hisato Shibata, Chiba (JP); Takehiro Yamaguchi, Chiba (JP); Chen Xu, Chiba (JP); Tetsuya Kanbe, Chiba (JP); Tomoo Shige, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 16/407,412

(22) Filed: May 9, 2019

(65) Prior Publication Data

US 2019/0355387 A1  Nov. 21, 2019

(30) Foreign Application Priority Data

May 21, 2018 (JP) .............................. JP2018-096805

(51) Int. Cl.
*G11B 5/66* (2006.01)
*G11B 5/64* (2006.01)
*G11B 5/65* (2006.01)

(52) U.S. Cl.
CPC .............. *G11B 5/66* (2013.01); *G11B 5/647* (2013.01); *G11B 5/656* (2013.01)

(58) Field of Classification Search
None
See application file for complete search history.

(56) References Cited

U.S. PATENT DOCUMENTS

| 7,531,248 | B1 | 5/2009 | Nolan et al. |
| 8,507,114 | B2 | 8/2013 | Peng et al. |
| 8,580,410 | B2* | 11/2013 | Onoue ............ G11B 5/65 428/830 |
| 8,623,528 | B2* | 1/2014 | Umezawa ........ G11B 5/65 428/829 |
| 9,406,329 | B1* | 8/2016 | Ho ................. G11B 5/65 |
| 9,607,644 | B2 | 3/2017 | Moriya |
| 2007/0218316 | A1 | 9/2007 | Inomata |
| 2007/0248843 | A1 | 10/2007 | Wu et al. |

(Continued)

FOREIGN PATENT DOCUMENTS

| CN | 104781446 | 7/2015 |
| CN | 105874536 | 8/2016 |

(Continued)

OTHER PUBLICATIONS

Office Action dated Oct. 5, 2020 issued with respect to the related U.S. Appl. No. 16/279,143.

*Primary Examiner* — Kevin M Bernatz
(74) *Attorney, Agent, or Firm* — IPUSA PLLC

(57) ABSTRACT

A magnetic recording medium includes: a substrate; an underlayer; and a magnetic layer including an alloy having a $L1_0$ structure and a (001) orientation, wherein the substrate, the underlayer, and the magnetic layer are stacked in the recited order, and wherein the magnetic layer has a granular structure and includes a carbon hydride, a boron hydride, or a boron nitride hydride.

7 Claims, 2 Drawing Sheets

(56) References Cited

U.S. PATENT DOCUMENTS

| | | | |
|---|---|---|---|
| 2010/0189886 A1* | 7/2010 | Peng | G11B 5/851 |
| | | | 427/130 |
| 2012/0028076 A1 | 2/2012 | Iwasaki et al. | |
| 2012/0250186 A1 | 10/2012 | Irisawa et al. | |
| 2013/0071695 A1* | 3/2013 | Peng | G11B 5/653 |
| | | | 428/831 |
| 2014/0104724 A1 | 4/2014 | Shiroishi et al. | |
| 2015/0138939 A1 | 5/2015 | Hellwig et al. | |
| 2016/0118071 A1 | 4/2016 | Hirotsune et al. | |
| 2016/0267934 A1 | 9/2016 | Furuta et al. | |
| 2017/0301366 A1* | 10/2017 | Chen | C30B 29/16 |
| 2017/0365279 A1 | 12/2017 | Fukushima et al. | |
| 2018/0166100 A1 | 6/2018 | Hasegawa et al. | |
| 2018/0174605 A1 | 6/2018 | Hasegawa et al. | |
| 2019/0295583 A1* | 9/2019 | Hasegawa | C23C 16/28 |

FOREIGN PATENT DOCUMENTS

| | | |
|---|---|---|
| JP | H01107316 | 4/1989 |
| JP | 2006-277950 | 10/2006 |
| JP | 2007-257679 | 10/2007 |
| JP | 2010-176829 | 8/2010 |

\* cited by examiner

MAGNETIC RECORDING MEDIUM AND MAGNETIC STORAGE APPARATUS

CROSS-REFERENCE TO RELATED APPLICATIONS

This application is based on and claims priority to Japanese Patent Application No. 2018-096805 filed on May 21, 2018, the entire contents of which are incorporated herein by reference.

BACKGROUND OF THE INVENTION

1. Field of the Invention

The disclosures herein generally relate to a magnetic recording medium and a magnetic storage apparatus.

2. Description of the Related Art

In recent years, demand for increasing the storage capacity of hard disk drives (HDDs) has been growing. Thus, a heat assisted magnetic recording method is proposed to heat and record a magnetic recording medium with a magnetic head that also incorporates (or includes) a laser light source. The heat assisted magnetic recording method can considerably reduce the coercivity of the magnetic recording medium through heating the magnetic recording medium. For this reason, a magnetic material having a high crystal magnetic anisotropy constant Ku may be used as a magnetic layer of the magnetic recording medium. As a result, the crystal grain size of the magnetic material can be reduced while maintaining thermal stability of the magnetic recording medium, and a recording density on the order of 1 Tbit/inch$^2$ can be achieved. Here, alloys proposed for use as the magnetic material having a high crystal magnetic anisotropy constant Ku include ordered alloys such as $L1_0$ FePt alloys, $L1_0$ CoPt alloys, or $L1_1$ CoPt alloys.

Also, carbon, carbide, oxide, nitride, or the like may be added as a nonmagnetic material that forms a grain boundary phase to isolate the crystal grains of an ordered alloy as described above, so as to form a magnetic layer having a granular structure. In this case, it is possible to reduce an exchange coupling between magnetic grains, and improve a SNR (Signal-to-Noise Ratio).

For example, Patent Document 1 describes a data storage medium that includes a magnetic recording layer including a magnetic material such as FePt and a nonmagnetic material such as C, BN, or $B_4C$.

RELATED-ART DOCUMENTS

Patent Documents

[Patent Document 1] Japanese Laid-Open Patent Publication No. 2010-176829

The heat assisted magnetic recording method uses laser light or the like to locally heat the magnetic layer of the magnetic recording medium so as to reduce the coercivity of the heated portion. In this case, in principle, the purpose of the heat assisted magnetic recording method can be achieved by heating only recording bits.

However, in an actual magnetic recording medium, heat spreads to bits adjacent to recording bits in a horizontal direction of the magnetic layer and consequently, the bits adjacent to the recording bits are also heated. In addition, because an underlayer, a substrate, or the like are arranged under the magnetic layer, the heat also spreads in a downward direction of the magnetic layer. In particular, when heat spreads in the horizontal direction of the magnetic layer, a magnetic transition area in an in-plane direction of the magnetic layer is enlarged. As a result, recording bleeding easily occurs, and the SNR of the magnetic recording medium decreases.

It is an object of one aspect of the present invention to provide a magnetic recording medium having a high SNR.

SUMMARY OF THE INVENTION (1) A magnetic recording medium includes: a substrate; an underlayer; and a magnetic layer including an alloy having a $L1_0$ structure and a (001) orientation, wherein the substrate, the underlayer, and the magnetic layer are stacked the recited order, and wherein the magnetic layer has a granular structure and includes a carbon hydride, a boron hydride, or a boron nitride hydride.

(2) The magnetic recording medium according to (1), wherein the carbon hydride, the boron hydride, or the boron nitride hydride has an amorphous structure and part of atoms constituting the carbon hydride, the boron hydride, or the boron nitride hydride are substituted by hydrogen atoms.

(3) The magnetic recording medium according to (1), wherein in the magnetic layer, a content of the carbon hydride, the boron hydride, or the boron nitride hydride is 3% by volume or more and 60% by volume or less.

(4) The magnetic recording medium according to (1), wherein the magnetic layer has a thickness of 1 nm or more and 10 nm or less.

(5) The magnetic recording medium according to (1), wherein the carbon hydride, the boron hydride, or the boron nitride hydride is included at grain boundaries of magnetic grains in the magnetic layer.

(6) The magnetic recording medium according to (1), wherein the magnetic grains include an FePt alloy or a CoPt alloy.

(7) A magnetic storage apparatus includes: the magnetic recording medium according to (1).

According to one aspect of the present invention, it is possible provide a magnetic recording medium having a high SNR.

DESCRIPTION OF THE PREFERRED EMBODIMENTS

In the following, an embodiment of the present invention will be described with reference to the accompanying drawings. The present invention is not limited to the embodiment as will be described below, and various variations and modifications may be made without departing from the scope of the present invention.

(Magnetic Recording Medium)

Figure 1:
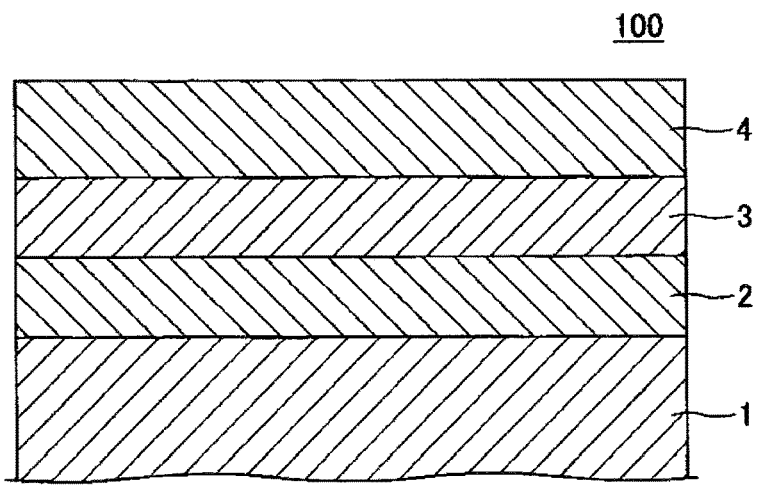
FIG. 1 is a schematic diagram illustrating an example of a magnetic recording medium according to an embodiment.

FIG. 1 illustrates an example of a magnetic recording medium 100 according to an embodiment.

The magnetic recording medium 100 illustrated in FIG. 1 includes a substrate 1, an underlayer 2, a magnetic layer 3, and a protective layer 4 that are successively stacked the recited order. The magnetic layer 3 is (001) oriented and has a $L1_0$ structure, and the protective layer 4 includes diamond-like carbon (DLC). Here, the magnetic layer 3 has a granular structure including columnar crystalline magnetic grains that are (001) oriented. Also, the magnetic layer 3 includes a carbon hydride, a boron hydride, or a boron nitride hydride.

A thermal insulation property between adjacent columnar crystalline magnetic grains of the magnetic layer 3 can be enhanced, because the magnetic layer 3 has a structure as described above. As a result, when laser light is emitted from a magnetic head, heat does not easily spread in a horizontal direction of the magnetic layer 3. Hence, recording bleeding is not easily generated, and the SNR of the magnetic recording medium 100 can be increased.

In addition, when a carbon hydride, a boron hydride, or a boron nitride hydride, which is included in the magnetic layer 3, is included at the grain boundaries of columnar crystalline magnetic grains that are (001)-oriented and included in the magnetic layer 3, the thermal insulation property between the magnetic grains constituting the magnetic layer 3 can be further enhanced.

Examples of a suitable carbon hydride include graphite or diamond in which part of constituent atoms are substituted by hydrogen atoms, hard carbon having C—$H_x$ bonds (wherein x is 1, 2 or 3), hydrogen-containing amorphous carbon (a-C:H), and the like.

Examples of a suitable boron hydride include a boron crystalin which part of constituent atoms are substituted by hydrogen atoms, hydrogen-containing amorphous boron (a-B:H), and the like.

Examples of a suitable boron nitride hydride include a boron nitride crystal in which part of constituent atoms are substituted by hydrogen atoms, hydrogen-containing amorphous boron nitride (a-BN:H), and the like.

As a reason why the heat insulation property between adjacent magnetic grains is enhanced by the magnetic layer 3 having a configuration as described above, the following can be considered.

In a magnetic layer having a conventional granular structure, a nonmagnetic material such as carbon, carbide, oxide, nitride, or the like is present at grain boundaries of magnetic grains. In this case, when the thermal conductivity of the nonmagnetic material constituting the grain boundary portion is reduced to enhance the heat insulation property between adjacent magnetic grains, the crystallinity and orientation of the magnetic grains are reduced by in accordance with the reduction of the thermal conductivity of the nonmagnetic material.

With respect to the above, according to the present embodiment, because the magnetic layer 3 having a granular structure includes a carbon hydride, a boron hydride, or a boron nitride hydride, the thermal conductivity of the magnetic layer 3 can be reduced without affecting the crystallinity and the orientation of the magnetic grains.

Here, carbon is a nonmagnetic material that is used at grain boundaries of magnetic grains in a magnetic layer having a conventional granular structure. Also, boron and boron nitride have characteristics similar to that of a nitride that is used at the grain boundaries of the magnetic grains in the magnetic layer having a conventional granular structure. For this reason, carbon, boron and boron nitride do not easily affect the crystallinity and the orientation of the magnetic grains.

Conversely, because a carbon hydride, a boron hydride, or a boron nitride hydride includes a small atomic radius of hydrogen, it is possible to reduce the thermal conductivity of the magnetic layer in addition to not easily affecting the crystallinity and the orientation of the magnetic grains. In particular, when the carbon hydride, the boron hydride, or the boron nitride hydride has an amorphous structure, the thermal conductivity of the magnetic layer can be further decreased.

Also, when the carbon hydride, the boron hydride, or the boron nitride hydride, which is included in the magnetic layer 3, is included at grain boundaries of columnar crystalline magnetic grains that are (001)-oriented and included in the magnetic layer 3, the thermal insulation property in the horizontal direction between the magnetic grains constituting the magnetic layer 3 can be further enhanced.

For the reason described above, in the magnetic recording medium 100, the thermal insulation property can be considered to be enhanced in the horizontal direction of the magnetic layer 3, that is, between the adjacent magnetic grains.

It is preferable that the thermal conductivity of the carbon hydride, the boron hydride, or the boron nitride hydride is less than or equal to one-half the thermal conductivity of $SiO_2$, that is, 0.7 W/(m·k) or less.

The magnetic layer 3 can be formed by a sputtering method.

When forming the magnetic layer 3, it is preferable to use a RF (Radio-Frequency) sputtering method, in order to reduce a temperature rise of the sputtering target. Thereby, it is possible to reduce decomposition of the carbon hydride, the boron hydride, or the boron nitride hydride. It is also possible to use a sputtering target having a low electrical conductivity.

Note that the carbon hydride, the boron hydride, or the boron nitride hydride included in the magnetic layer 3 may be partially decomposed into carbon, boron or boron nitride.

A method of manufacturing a sputtering target that is used to form the magnetic layer 3 may be a method of sintering a composition containing a carbon hydride, a boron hydride, or a boron nitride hydride, and a magnetic powder, a method of sintering a composition containing carbon, boron, or boron nitride, and a magnetic powder, or the like.

Also, when forming the magnetic layer 3, using a sputtering target manufactured by sintering a composition containing carbon, boron, or boron nitride and a magnetic powder, hydrogen may be introduced into a sputtering gas.

Also, when forming the magnetic layer 3, after sputtering using a sputtering target manufactured by sintering a composition containing carbon, boron, or boron nitride and a magnetic powder, it may be exposed to hydrogen plasma.

In the magnetic layer 3, the content of a carbon hydride, a boron hydride, or a boron nitride hydride is preferably 3% by volume or more and 60% by volume or less, and is more preferably 20% by volume or more and 50% by volume or less. When the content of a carbon hydride, a boron hydride, or a boron nitride hydride in the magnetic layer 3 is 3% by volume or more, the thermal insulation property between adjacent magnetic grains can be enhanced. When the content of a carbon hydride, a boron hydride, or a boron nitride hydride in the magnetic layer 3 is 60% by volume or less, the magnetic grain volume per 1 bit increases, and a thermal instability of the magnetic recording medium 100 is reduced.

Here, the content of carbon, boron, or boron nitride and the content of a carbon hydride, a boron hydride, or a boron nitride hydride in the magnetic layer 3 do not necessarily match the content of carbon, boron, or boron nitride and the content of a carbon hydride, a boron hydride, or a boron nitride hydride in a sputtering target that is used to form the magnetic layer 3. Thus, through a preliminary experiment, a relationship between the ratio between carbon, boron, or boron nitride and a carbon hydride, a boron hydride, or a boron nitride hydride in the magnetic layer 3, the content of carbon, boron, or boron nitride and the content of a carbon hydride, a boron hydride, or a boron nitride hydride in a sputtering target, which is used to form the magnetic layer 3, and deposition conditions of the magnetic layer 3 may be calculated. Thereby, the content of the carbon hydride, the boron hydride, or the boron nitride hydride in the magnetic layer 3 to be actually deposited can be determined.

A thickness of the magnetic layer 3 is preferably 1 nm or more and 10 nm or less, and is more preferably 1.5 nm or more and 5.5 nm or less. When the thickness of the magnetic layer 3 is 1 nm or more and 10 nm or less, it is possible to enhance the (001) orientation and the ordering of the magnetic layer 3 having the $L1_0$ structure. In addition, it is possible to enhance the thermal insulation property between the adjacent magnetic grains of the magnetic layer 3 having the granular structure.

The magnetic grains preferably include an FePt alloy or a CoPt alloy. Thereby, a crystal magnetic anisotropy constant Ku of the magnetic grains is increased.

As the substrate 1, a known substrate may be used.

Here, when manufacturing the magnetic recording medium 100, it may be necessary to heat the substrate 1 to a temperature of 500° C. or higher. For this reason, as the substrate 1, a heat-resistant glass substrate having a softening temperature of 500° C. or higher, preferably 600° C. or higher, for example, may be used.

A material forming the underlayer 2 is not limited to a particular material, as long as the material is suited for the (001) orientation of the magnetic layer 3 having the $L1_0$ structure. For example, a material such as W or MgO having a (100) orientation may be used for the underlayer 2.

Also, the underlayer 2 may have a multi-layer structure. In this case, a lattice misfit (or mismatch) among a plurality of layers forming the underlayer 2 having the multi-layer structure is preferably 10% or less.

The underlayer having the multi-layer structure may be an underlayer in which W, MgO, and the like having a (100) orientation are stacked, for example.

Also, in order to positively cause the underlayer 2 to have the (100) orientation, a layer including one of Cr, an alloy including Cr and having a BCC (Body-Centered Cubic) structure, and an alloy having a B2 structure, may further be formed under the underlayer 2.

Here, examples of the alloy including Cr and having the BCC structure include a CrMn alloy, a CrMo alloy, a CrW alloy, a CrV alloy, a CrTi alloy, a CrRu alloy, and the like, for example.

Also, examples of the alloy having the B2 structure include a RuAl alloy, a NiAl alloy, and the like, for example.

Although, the protective layer 4 is formed on the magnetic layer 3 in the magnetic recording medium 100, the protective layer 4 may be omitted.

A method of forming the protective layer 4 is not limited to a particular method. For example, a RF-CVD (Radio Frequency-Chemical Vapor Deposition) method that decomposes a source gas made of hydrocarbon by high-frequency plasma, an IBD (Ion Beam Deposition) method that ionizes a source gas by electrons emitted from a filament, a FCVA (Filtered Cathodic Vacuum Arc) method that uses a solid carbon target without using a source gas, or the like may be used to form the protective layer 4.

The thickness of the protective layer 4 is preferably 1 nm or more and 6 nm or less. The floating properties of the magnetic head become satisfactory when the thickness of the protective layer 4 is 1 nm or more. Also, a magnetic spacing decreases and the SNR of the magnetic recording medium 100 is enhanced when the thickness of the protective layer 4 is 6 nm or less.

In the magnetic recording medium 100, a lubricant layer including a perfluoropolyether fluorine resin may be further formed on the protective layer 4.

(Magnetic Storage Apparatus)

A magnetic storage apparatus according to the present embodiment is not limited to a particular structure, as long as the magnetic storage apparatus includes a magnetic recording medium according to the embodiment described above.

The magnetic storage apparatus according to the present embodiment includes, for example, a magnetic recording medium drive unit for rotating a magnetic recording medium, a magnetic head provided with a near field light generation element on its tip, a magnetic head drive unit for moving the magnetic head, and a recording and reproducing signal processing system. Also, the magnetic head includes, for example, a laser light generation unit for heating the magnetic recording medium, and a waveguide for guiding laser light generated from the laser light generation unit to the near field light generation element.

Figure 2:
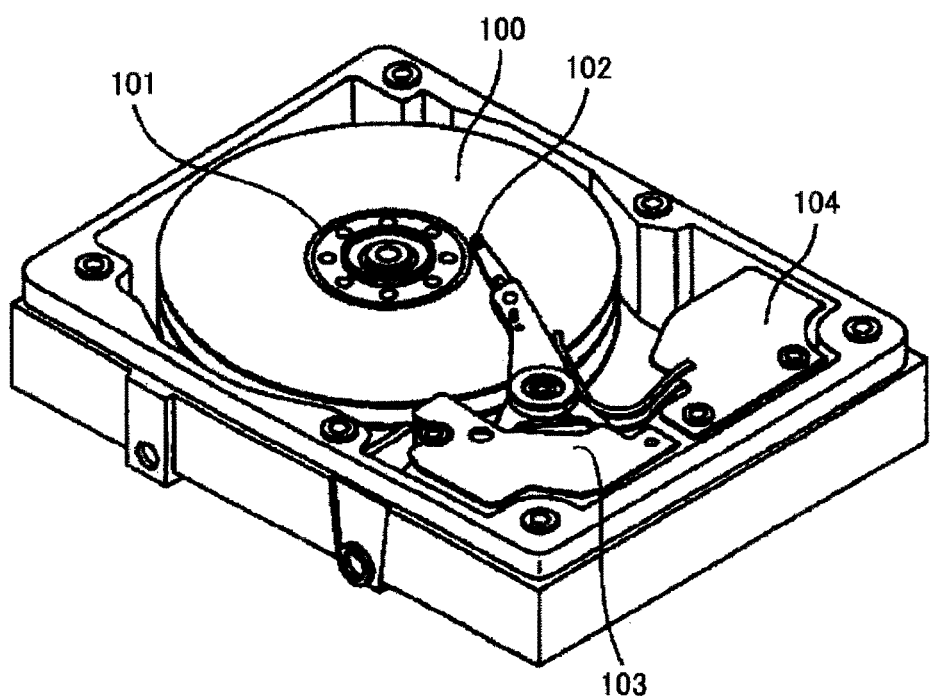
FIG. 2 is a schematic diagram illustrating an example of a magnetic storage apparatus according to the embodiment.

FIG. 2 illustrates an example of a magnetic storage apparatus according to the embodiment.

The magnetic storage apparatus illustrated in FIG. 2 includes a magnetic recording medium 100, a magnetic recording medium drive unit 101 for rotating the magnetic recording medium 100, a magnetic head 102, a magnetic head drive unit 103 for moving the magnetic head 102, and a recording and reproducing signal processing system 104.

Figure 3:
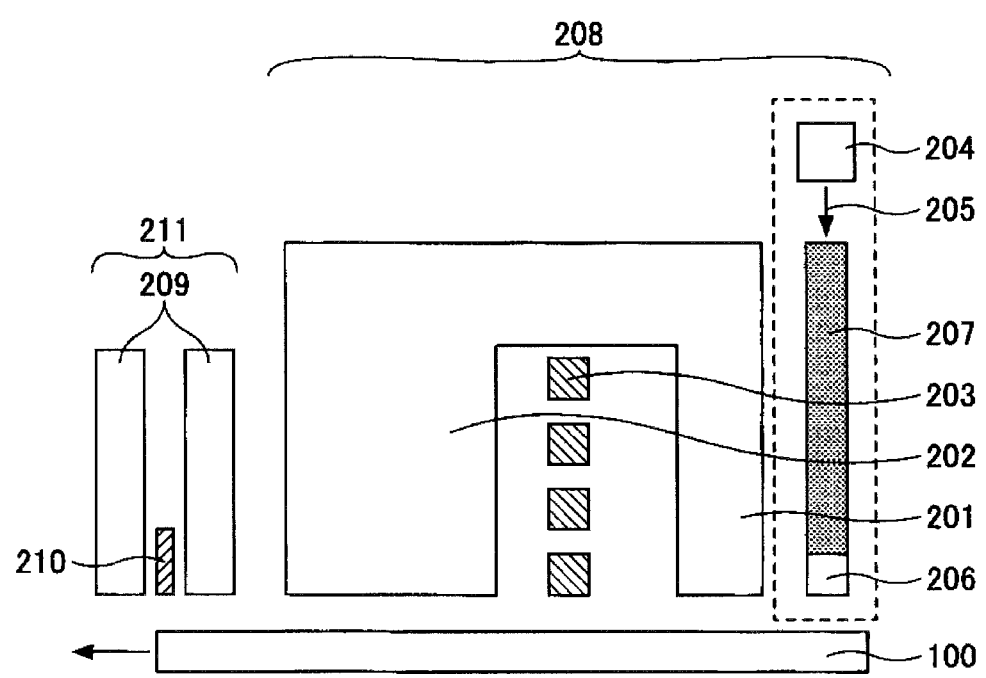
FIG. 3 is a schematic diagram illustrating an example of a magnetic head used in the magnetic storage apparatus of FIG. 2.

FIG. 3 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser light generation unit, and a waveguide 207 for transmitting laser light 205 generated at the LD 204 to a near field light generation element 206.

The reproducing head 211 includes a reproducing element 210 sandwiched by shields 209.

EXAMPLES

In the following, Examples of the present invention will be described. The present invention is not limited to the following Examples.

[Preparation of Sputtering Target 1]

A sputtering target 1 having a composition of 60 vol % (52 at % Fe-48 at % Pt)-40 vol % C was manufactured by a manufacturing method described below.

An FePt alloy powder having a composition of 52 at % Fe-48 at % Pt was obtained using a gas atomization method. The FePt alloy powder had an average grain diameter of 15 µm.

The FePt alloy powder and carbon black (having an average grain diameter of 0.05 µm and an amorphous structure) were mixed at a volume ratio of 60:40, and then compressed and molded into the form of a disc. Next, the compressed and molded mixture was sintered in a high vacuum of $1\times10^{-3}$ Pa under conditions of a sintering temperature of 1000° C., a sintering time of 3 hours, and a sintering pressure of 300 kgf/cm² to obtain the sputtering target 1 made of the sintered body having a diameter of 200 mm. The sputtering target 1 was composed of the FePt alloy and carbon of the amorphous structure.

[Preparation of Sputtering Target 2]

A sputtering target 2 having a composition of 60 vol % (52 at % Fe-48 at % Pt)-40 vol % B was manufactured by a manufacturing method described below.

An FePt alloy powder having a composition of 52 at % Fe-48 at % Pt was obtained using a gas atomization method. The FePt alloy powder had an average grain diameter of 15 μm.

The FePt alloy powder and a boron powder (having an average grain diameter of 15 μm and an amorphous structure) were mixed at a volume ratio of 60:40, and then compressed and molded into the form of a disc. Next, the compressed and molded mixture was sintered in a high vacuum of $1\times10^{-3}$ Pa under conditions of a sintering temperature of 1000° C., a sintering time of 3 hours, and a sintering pressure of 300 kgf/cm² to obtain the sputtering target 2 made of the sintered body having a diameter of 200 mm. The sputtering target 2 was composed of the FePt alloy and boron of the amorphous structure.

[Preparation of Sputtering Target 3]

A sputtering target 3 having a composition of 60 vol % (52 at % Fe-48 at % Pt)-40 vol % BN was manufactured by a manufacturing method described below.

An FePt alloy powder having a composition of 52 at % Fe-48 at % Pt was obtained using a gas atomization method. The FePt alloy powder had an average grain diameter of 15 μm.

The FePt alloy powder and a hexagonal crystal boron nitride (h-BN) powder (having an average grain diameter of 15 μm) were mixed at a volume ratio of 60:40, and then compressed and molded into the form of a disc. Next, the compressed and molded mixture was sintered in a high vacuum of $1\times10^{-3}$ Pa under conditions of a sintering temperature of 1000° C., a sintering time of 3 hours, and a sintering pressure of 300 kgf/cm² to obtain the sputtering target 3 made of the sintered body having a diameter of 200 mm. The sputtering target 3 was composed of the FePt alloy and h-BN.

Example 1

First, an underlayer was deposited on a glass substrate having a diameter of 2.5 inches. Specifically, a 50Co-50Ti film having a film thickness of 50 nm was deposited on the 2.5-inch glass substrate, as a first underlayer, and the glass substrate was thereafter heated at 300° C., where the "50Co-50Ti film" represents an alloy of 50 at % Co and 50 at % Ti, and similar representations are used hereinafter. Next, a 80Cr-20V film having a film thickness of 12 nm was deposited as a second underlayer. Further, a W film having a film thickness of 40 nm was deposited as a third underlayer, and a MgO film having a film thickness of 3 nm was deposited as a fourth underlayer. Note that a DC magnetron sputtering apparatus was used to deposit the first through fourth underlayers, and Ar was used as a sputtering gas.

Thereafter, the glass substrate was heated at 520° C. Next, a magnetic layer having a thickness of 2 nm was deposited on the underlayer (including the first through fourth underlayers), using a RF sputtering apparatus and the sputtering target 1. At this time, a mixed gas of Ar and hydrogen (volume ratio 5:1) was introduced at a pressure of 3 Pa as a sputtering gas. Then, a temperature of the glass substrate was controlled to 480° C.

Upon using an infrared spectrometer (IR) to analyze the magnetic layer, it was found from the presence of a peak of C—H stretching vibration that the magnetic layer included hydrogen-containing amorphous carbon (a-C:H). Also, from the intensity of the peak of C—H stretching vibration and the intensity of the peak of C—C stretching vibration, the content of a-C:H and the content of non-hydrogenated carbon in the magnetic layer were respectively determined as 10% by volume and 30% by volume.

Thereafter, a protective layer made of DLC having a thickness of 3 nm was formed on the magnetic layer. Next, on the protective layer, a lubricant layer made of a perfluoropolyether fluorine resin having a thickness of 1.2 nm was formed to obtain the magnetic recording medium of Example 1.

Upon using an X-ray diffraction (XRD) apparatus to analyze the underlayer and the magnetic layer, it was confirmed that the underlayer was a (100)-oriented film having a BCC structure, and that the magnetic layer was a (001)-oriented film having a $L1_0$ structure.

Example 2

The magnetic recording medium of Example 2 was manufactured similarly to the magnetic recording medium of Example 1, except that the sputtering target 2 was used in place of the sputtering target 1.

Upon using an infrared spectrometer (IR) to analyze the magnetic layer, it was found from the presence of a peak of B—H stretching vibration that the magnetic layer included hydrogen-containing amorphous boron (a-B:H). Also, from the intensity of the peak of B—H stretching vibration and the intensity of the peak of B—B stretching vibration, the content of a-B:H and the content of non-hydrogenated boron in the magnetic layer were respectively determined as 10% by volume and 30% by volume.

Upon using an X-ray diffraction (XRD) apparatus to analyze the underlayer and the magnetic layer, it was confirmed that the underlayer was a (100)-oriented film having a BCC structure, and that the magnetic layer was a (001)-oriented film having a $L1_0$ structure.

Example 3

The magnetic recording medium of Example 3 was manufactured similarly to the magnetic recording medium of Example 1, except that the sputtering target 3 was used in place of the sputtering target 1.

Upon using an infrared spectrometer (IR) to analyze the magnetic layer, it was found from the presences of peaks of B—H stretching vibration and N—H stretching vibration that the magnetic layer included hydrogen-containing amorphous boron nitride (a-BN:H). Also, from the intensities of the peaks of B—H stretching vibration and N—H stretching vibration and the intensity of the peak of B—N stretching vibration, the content of a-BN:H and the content of non-hydrogenated boron nitride in the magnetic layer were respectively determined as 10% by volume and 30% by volume.

Upon using an X-ray diffraction (XRD) apparatus to analyze the underlayer and the magnetic layer, it was confirmed that the underlayer was a (100)-oriented film having a BCC structure, and that the magnetic layer was a-(001) oriented film having a $L1_0$ structure.

Example 4

The magnetic recording medium of Example 4 was manufactured similarly to the magnetic recording medium of Example 3, except that the volume ratio of the sputtering gas (mixed gas of Ar and hydrogen) was changed to 10:1.

Upon using an infrared spectrometer (IR) to analyze the magnetic layer, it was found from the presences of peaks of B—H stretching vibration and N—H stretching vibration that the magnetic layer included hydrogen-containing amorphous boron nitride (a-BN:H). Also, from the intensities of the peaks of B—H stretching vibration and N—H stretching vibration and the intensity of the peak of B—N stretching vibration, the content of a-BN:H and the content of non-hydrogenated boron nitride in the magnetic layer were respectively determined as 13% by volume and 37% by volume.

Example 5

The magnetic recording medium of Example 5 was manufactured similarly to the magnetic recording medium of Example 3, except that the volume ratio of the sputtering gas (mixed gas of Ar and hydrogen) was changed to 15:1.

Upon using an infrared spectrometer (IR) to analyze the magnetic layer, it was found from the presences of peaks of B—H stretching vibration and N—H stretching vibration that the magnetic layer included hydrogen-containing amorphous boron nitride (a-BN:H). Also, from the intensities of the peaks of B—H stretching vibration and N—H stretching vibration and the intensity of the peak of B—N stretching vibration, the content of a-BN:H and the content of non-hydrogenated boron nitride in the magnetic layer were respectively determined as 1.5% by volume and 38.5% by volume.

Example 6

The magnetic recording medium of Example 6 was manufactured similarly to the magnetic recording medium of Example 3, except that the volume ratio of the sputtering gas (mixed gas of Ar and hydrogen) was changed to 3:1.

Upon using an infrared spectrometer (IR) to analyze the magnetic layer, it was found from the presences of peaks of B—H stretching vibration and N—H stretching vibration that the magnetic layer included hydrogen-containing amorphous boron nitride (a-BN:H). Also, from the intensities of the peaks of B—H stretching vibration and N—H stretching vibration and the intensity of the peak of B—N stretching vibration, the content of a-BN:H and the content of non-hydrogenated boron nitride in the magnetic layer were respectively determined as 40% by volume and 0% by volume.

Comparative Examples 1 to 3

For each of Comparative Examples 1 to 3, the magnetic recording medium was manufactured similarly to the magnetic recording mediums of Examples 1 to 3, except that only Ar was introduced as the sputtering gas when depositing the magnetic layer.

Upon using an X-ray diffraction (XRD) apparatus to analyze the underlayer and the magnetic layer, it was confirmed that the underlayer was a (100)-oriented film having a BCC structure, and that the magnetic layer was (001)-oriented film having a $L1_0$ structure.

Next, the SNR of each magnetic recording medium was measured.

(SNR)

Using the magnetic head illustrated in FIG. 3, the SNR of each magnetic recording medium was measured.

Table 1 indicates the measurement results of the SNR of each magnetic recording medium.

TABLE 1

| | COMPOSITION OF MAGNETIC LAYER | SNR [dB] |
|---|---|---|
| EXAMPLE 1 | 60 VOL %(52 at % Fe-48 at % Pt)-10 VOL %(a-C:H)-30 VOL %(C) | 5.0 |
| EXAMPLE 2 | 60 VOL %(52 at % Fe-48 at % Pt)-10 VOL %(a-B:H)-30 VOL %(B) | 4.6 |
| EXAMPLE 3 | 60 VOL %(52 at % Fe-48 at % Pt)-10 VOL %(a-BN:H)-30 VOL %(BN) | 5.5 |
| EXAMPLE 4 | 60 VOL %(52 at % Fe-48 at % Pt)-3 VOL %(a-BN:H)-37 VOL %(BN) | 4.4 |
| EXAMPLE 5 | 60 VOL %(52 at % Fe-48 at % Pt)-1.5 VOL %(a-BN:H)-38.5 VOL %(BN) | 4.1 |
| EXAMPLE 6 | 60 VOL %(52 at % Fe-48 at % Pt)-40 VOL %(a-BN:H) | 3.9 |
| COMPARATIVE EXAMPLE 1 | 60 VOL %(52 at % Fe-48 at % Pt)-40 VOL %(a-C) | 3.8 |
| COMPARATIVE EXAMPLE 2 | 60 VOL %(52 at % Fe-48 at % Pt)-40 VOL %(B) | 3.0 |
| COMPARATIVE EXAMPLE 3 | 60 VOL %(52 at % Fe-48 at % Pt)-40 VOL %(BN) | 3.5 |

From Table 1, it is apparent that, in each of Examples 1 to 6, the magnetic recording medium has a high SNR.

Conversely, in each of Comparative Examples 1 to 3, the magnetic recording medium has a low SNR because the magnetic layer does not contain a carbon hydride, a boron hydride, or a boron nitride hydride.

What is claimed is:

1. A magnetic recording medium comprising:
a substrate;
an underlayer; and
a magnetic layer including an alloy having a $L1_0$ structure and a (001) orientation,
wherein the substrate, the underlayer, and the magnetic layer are stacked in the recited order, and
wherein the magnetic layer has a granular structure and includes a carbon hydride, a boron hydride, or a boron nitride hydride.

2. The magnetic recording medium according to claim 1, wherein the carbon hydride, the boron hydride, or the boron nitride hydride has an amorphous structure and part of atoms constituting the carbon hydride, the boron hydride, or the boron nitride hydride are substituted by hydrogen atoms.

3. The magnetic recording medium according to claim 1, wherein in the magnetic layer, a content of the carbon hydride, the boron hydride, or the boron nitride hydride is 3% by volume or more and 60% by volume or less.

4. The magnetic recording medium according to claim 1, wherein the magnetic layer has a thickness of 1 nm or more and 10 nm or less.

5. The magnetic recording medium according to claim 1, wherein the carbon hydride, the boron hydride, or the boron nitride hydride is included at grain boundaries of magnetic grains in the magnetic layer.

6. The magnetic recording medium according to claim 5, wherein the magnetic grains include an FePt alloy or a CoPt alloy.

7. A magnetic storage apparatus comprising:
the magnetic recording medium according to claim 1.

* * * * *